US008904052B2

(12) United States Patent
Jang

(10) Patent No.: US 8,904,052 B2

(45) Date of Patent: Dec. 2, 2014

(54) COMBINED INPUT PORT

(75) Inventor: Changsoo Jang, San Jose, CA (US)

(73) Assignee: Apple Inc., Cupertino, CA (US)

(*) Notice: Subject to any disclaimer, the term of this patent is extended or adjusted under 35 U.S.C. 154(b) by 2 days.

(21) Appl. No.: 13/336,033

(22) Filed: Dec. 23, 2011

(65) Prior Publication Data

US 2013/0166786 A1 Jun. 27, 2013

(51) Int. Cl.

*G06F 3/00* (2006.01)

*G06F 5/00* (2006.01)

(52) U.S. Cl.

USPC .................................. 710/12; 710/43; 710/63

(58) Field of Classification Search

None

See application file for complete search history.

(56) References Cited

U.S. PATENT DOCUMENTS

| | | | |
|---|---|---|---|
| 3,883,861 | A | 5/1975 | Heartz |
| 4,369,439 | A | 1/1983 | Broos |
| 4,506,354 | A | 3/1985 | Hansen |
| 5,059,959 | A | 10/1991 | Barry |
| 5,317,105 | A | 5/1994 | Weber |
| 5,342,991 | A | 8/1994 | Xu et al. |
| 5,770,898 | A | 6/1998 | Hannigan et al. |
| 5,959,612 | A | 9/1999 | Breyer et al. |
| 5,975,953 | A | 11/1999 | Peterson |
| 6,130,663 | A | 10/2000 | Null |
| 6,198,470 | B1 | 3/2001 | Agam et al. |
| 6,313,825 | B1 | 11/2001 | Gilbert |
| 6,337,678 | B1 | 1/2002 | Fish |
| 6,429,846 | B2 | 8/2002 | Rosenberg et al. |
| 6,713,672 | B1 | 3/2004 | Stickney |
| 6,800,805 | B2 | 10/2004 | Deguchi |
| 6,987,466 | B1 | 1/2006 | Welch et al. |
| 7,075,793 | B2 | 7/2006 | Le et al. |
| 7,113,196 | B2 | 9/2006 | Kerr |
| 7,125,287 | B1 | 10/2006 | Chou et al. |
| 7,345,677 | B2 | 3/2008 | Ing et al. |
| 7,411,581 | B2 | 8/2008 | Hardie-Bick |
| 7,470,862 | B2 | 12/2008 | Lin et al. |
| 7,470,866 | B2 | 12/2008 | Dietrich et al. |
| 7,473,139 | B2 | 1/2009 | Barringer et al. |
| 7,511,711 | B2 | 3/2009 | Ing et al. |

(Continued)

FOREIGN PATENT DOCUMENTS

| | | |
|---|---|---|
| CN | 201898231 | 7/2011 |
| JP | 58112263 | 7/1983 |

(Continued)

OTHER PUBLICATIONS

Kwon et al., "Haptic Interferences for Mobile Devices: a Survey of the State of the Art," Telerobotics and Control Laboratory, KAIST (Korea Advanced Institute of Science and Technology, Korea, Dec. 11, 2007.

*Primary Examiner* — Zachary K Huson

(74) *Attorney, Agent, or Firm* — Brownstein Farber Hyatt Schreck, LLP

(57) ABSTRACT

An input port for an electronic device for receiving different types of connectors, memory cards, or plugs. The input port includes an outer wall defining a receiving aperture, a substrate positioned within the receiving aperture. A first set of contacts is positioned on the substrate at a first depth into the receiving aperture and a second set of contacts is positioned on a first surface of the outer wall at a second depth into the receiving aperture. The first set of contacts is configured to communicate with a first connector and the second set of contacts is configured to communicate with a second connector.

20 Claims, 18 Drawing Sheets

(56) References Cited

U.S. PATENT DOCUMENTS

| | | | | |
|---|---|---|---|---|
| 7,575,481 | B1 | 8/2009 | Liu | |
| 7,620,316 | B2 | 11/2009 | Boillot | |
| 7,656,393 | B2 | 2/2010 | King et al. | |
| 7,710,397 | B2 | 5/2010 | Krah et al. | |
| 7,725,288 | B2 | 5/2010 | Boillot | |
| 7,834,855 | B2 | 11/2010 | Hotelling et al. | |
| 7,844,310 | B2 | 11/2010 | Anderson | |
| 7,845,953 | B2 | 12/2010 | Brock et al. | |
| 7,852,369 | B2 | 12/2010 | Cutler et al. | |
| 7,884,315 | B2 | 2/2011 | Andre et al. | |
| 7,924,175 | B2 | 4/2011 | Gitzinger et al. | |
| 8,098,233 | B2 | 1/2012 | Hotelling et al. | |
| 8,167,658 | B1 * | 5/2012 | Liu | 439/630 |
| 2004/0238195 | A1 | 12/2004 | Thompson | |
| 2006/0197753 | A1 | 9/2006 | Hotelling | |
| 2007/0150639 | A1 * | 6/2007 | Chen | 710/313 |
| 2008/0103637 | A1 | 5/2008 | Bliven et al. | |
| 2009/0002328 | A1 | 1/2009 | Ullrich et al. | |
| 2009/0052715 | A1 | 2/2009 | Zhang et al. | |
| 2009/0173533 | A1 | 7/2009 | Brock et al. | |
| 2009/0173534 | A1 | 7/2009 | Keiper et al. | |
| 2009/0244836 | A1 | 10/2009 | Leng et al. | |
| 2010/0044067 | A1 | 2/2010 | Wong et al. | |
| 2010/0122439 | A1 | 5/2010 | Britton et al. | |
| 2010/0301755 | A1 | 12/2010 | Pance et al. | |
| 2010/0306683 | A1 | 12/2010 | Pance et al. | |
| 2011/0037624 | A1 | 2/2011 | Pance et al. | |
| 2011/0037734 | A1 | 2/2011 | Pance et al. | |
| 2011/0038114 | A1 | 2/2011 | Pance et al. | |
| 2011/0043227 | A1 | 2/2011 | Pance et al. | |
| 2011/0119973 | A1 | 5/2011 | Andre et al. | |
| 2011/0175813 | A1 | 7/2011 | Sarwar et al. | |

FOREIGN PATENT DOCUMENTS

| | | | |
|---|---|---|---|
| TW | M386637 | U1 | 8/2010 |
| TW | M389943 | U1 | 10/2010 |
| WO | WO2005/083547 | | 9/2005 |
| WO | WO2007/083894 | | 7/2007 |

* cited by examiner

COMBINED INPUT PORT

TECHNICAL FIELD

The present invention relates generally to electronic devices, and more specifically to input ports for electronic devices.

BACKGROUND

Computers and other electronic devices typically include one more input ports. The input ports receive a connector, examples of which are Universal Serial Bus (USB), mini-USB, high definition multi-media interface (HDMI), and an audio connector (e.g., tip ring sleeve). Each type of connector may require a separate input port, as the connectors may have different plug dimensions and/or electrical pin arrangements. To accommodate the different connectors, many electronic devices may include multiple different input ports spaced around an enclosure of the device. Additionally, some electronic devices may further include input ports to receive memory cards or other insertable connectors. These connectors or cards may also require separate ports to connect to the electronic devices.

Each of the various ports may require separate port around an enclosure for the electronic devices. The additional space may either require the electronic devices to be larger, or may cause the electronic device to only have one or two input ports, thus loosing additional connectivity.

SUMMARY

Examples of embodiments described herein may take the form of an input port for an electronic device for receiving different types of connectors, memory cards, plugs and the like. The input port includes an outer wall defining a receiving aperture, a substrate positioned within the receiving aperture. A first set of contacts is positioned on the substrate at a first depth into the receiving aperture and a second set of contacts is positioned on a first surface of the outer wall at a second depth into the receiving aperture. The first set of contacts is configured to communicate with a first connector and the second set of contacts is configured to communicate with a second connector.

Still other embodiments may take the form of an electronic device having an enclosure and an input receptacle defined within the enclosure. The input receptacle includes a substrate, a bottom wall, and a top wall operably connected to the bottom wall. Also, the input port includes a first electrical contact extending from a first surface of the substrate and a second electrical contact extending from an inner surface of the bottom wall. The first electrical contact and the second electrical contact are configured to transfer data and/or power to another device.

DETAILED DESCRIPTION

Some embodiments described herein may take the form of an input port or receptacle capable of receiving multiple types of plugs or connectors. As used herein, the terms "plug", "connector", and "electronic card" may refer generally to devices that may be inserted into an input port to transfer data to a device associated with the input port. Thus, the terms connector, plug, or card are intended to cover a broad spectrum of insertable devices and connectors. For example, the input port may receive a USB plug as well as a non-volatile memory card, such as a secure digital (SD) card. In some embodiments, the input port may have electrical contacts located at different depths for the different connectors, e.g., a first set of contacts for the USB plug and a second set of contacts for the memory card. In this manner, the correct contacts may be aligned with the correct connector, even though both connectors may be inserted into the same port.

As the combined input port allows for multiple input contacts for various connectors to be contained in a single input port, the combined input port may provide connectivity to multiple connectors, while only requiring the space on the device for a single input port. Thus, the input port may provide space savings to various electronic devices, as the enclosures for the respective electronic devices may only need to accommodate a single input port, while still providing connectivity to different types of connectors.

Figure 1A:
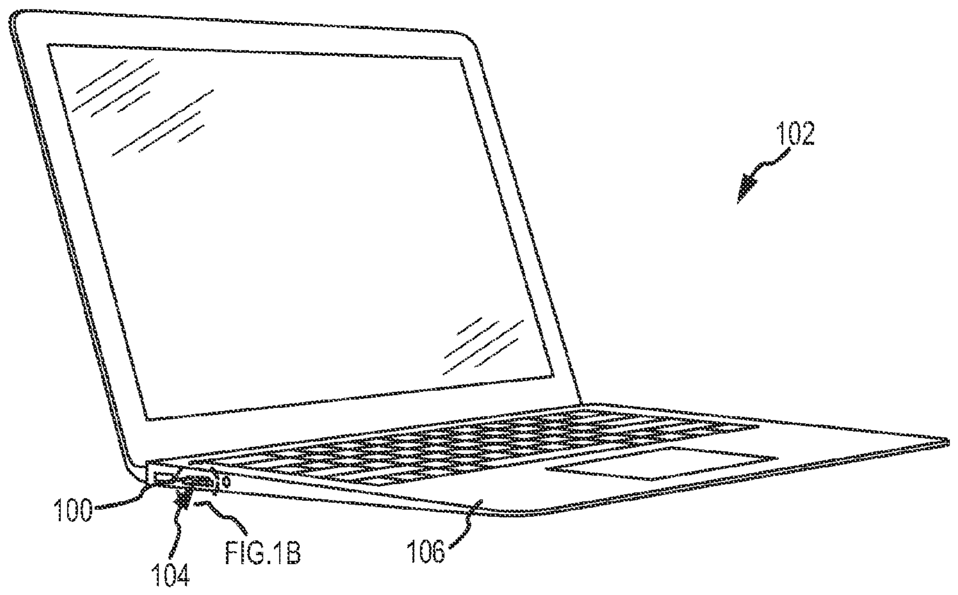
FIG. 1A is a perspective view of an electronic device including an input port.
Figure 1B:
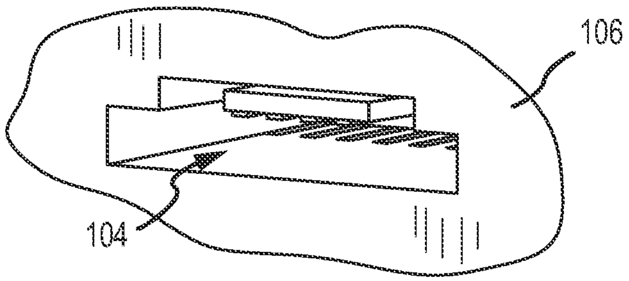
FIG. 1B is an enlarged perspective view of the input port.

Turning now to the figures, FIG. 1A is a perspective view of an electronic device 102 including the combined input port 104. The electronic device 102 as illustrated in FIG. 1A is a computer, although it should be appreciated that FIG. 1 is meant to be an example only and other electronic devices are envisioned. For example, the electronic device 102 may be a digital music player, smart phone, tablet computer, digital audio receiver, television, portable gaming device, and so on. With continued reference to FIG. 1A, the electronic device 102 may include an enclosure 106 surrounding select components of the device 102, such as a hard drive, processor, system bus, or the like. The enclosure 106 may define apertures 108 for providing communication to and from the input port 104, other ports, and/or switches or buttons.

The input port 104 may be aligned with the aperture 108 defined within the enclosure 106. In this manner, the input port 104 may be able be substantially uncovered so as to receive various connectors and/or plugs. The aperture 108 may be configured so as to generally trace the outer perimeter of the input port 104 and thus as the outer shape of the input port 104 may vary, as discussed in more detail below, the perimeter of the aperture 108 may also vary.

Connectors and Plugs for the Input Port

Figure 2A:
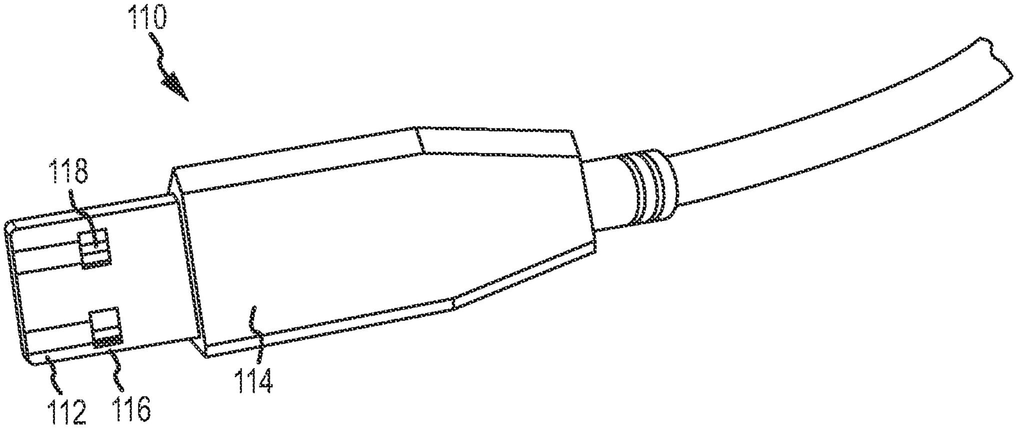
FIG. 2A is a top perspective view of a USB plug configured to be received within the input port.
Figure 2B:
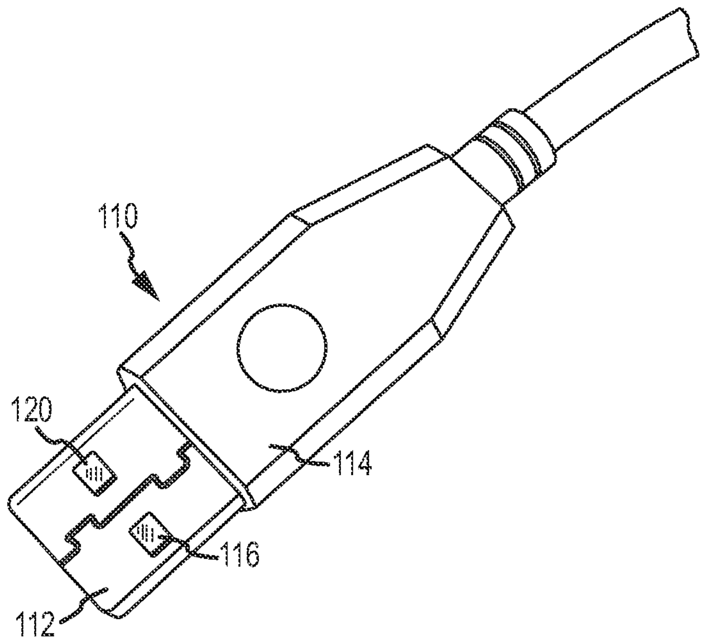
FIG. 2B is a bottom perspective view of the USB plug.
Figure 2C:
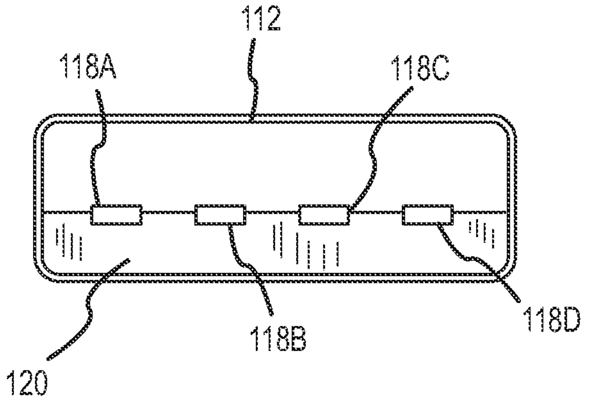
FIG. 2C is a front plan view of the USB plug.

Some connector examples for connecting to the input port 104 will now be discussed. FIG. 2A is a top view of a USB plug 110. FIG. 2B is a bottom plan view of the USB plug 110. FIG. 2C is a front elevation view of the USB plug 110. The USB plug 110 may be inserted into the input port 104 to provide a communication pathway to transfer data and/or power between the electronic device 102 and another device. For example, the USB plug 110 may be connected to another electronic device (e.g., smartphone, digital music player, and so on), memory (e.g., flash memory), or the like. It should be noted that although FIGS. 2A-2C illustrate a USB plug 110, other variations of the USB plug may also be received within the input port 104. For example, the USB plug 110 may be a USB2 or USB3 plug. In these embodiments, the plug may have substantially the same mechanical dimensions, but the electrical contacts may be differently arranged, or the plug may include additional electrical contacts to those illustrated in FIGS. 2A-2C.

The USB plug 110 may include a case 112 surrounding a substrate or contact support member 120. The contact support member 120 may be in contact, or nearly in contact, with the case 112 on three sides, such that a top surface of the contact support member 120 may be spaced apart from a bottom surface of the top of the case 112. The case 112 defines connection apertures 116 on both the top and bottom of the case 112. The connection apertures 116 may help secure the USB plug 110 into the receiving port 104. For example, the connection apertures 116 may receive springs, detents, or the like in the receiving port 104 to secure the USB plug 110 to the receiving port 104.

With reference to FIG. 2C, the contact support member 120 may include one or more plug contacts 118 spaced apart from each other. In one embodiment, there may be four plug contacts 118 spaced on the substrate. One contact 118 may transfer power, two contacts may transfer data, and one contact 118 may be a ground. The types of plug contacts 118 may vary depending on the device and/or data that may be transferred. As will be discussed in more detail below, the USB plug 110 may be received within the input port 104, and the contact support member 120 may align within the port 104 so that the contacts 118 may be in contact with corresponding contacts within the port 104.

Figure 3A:
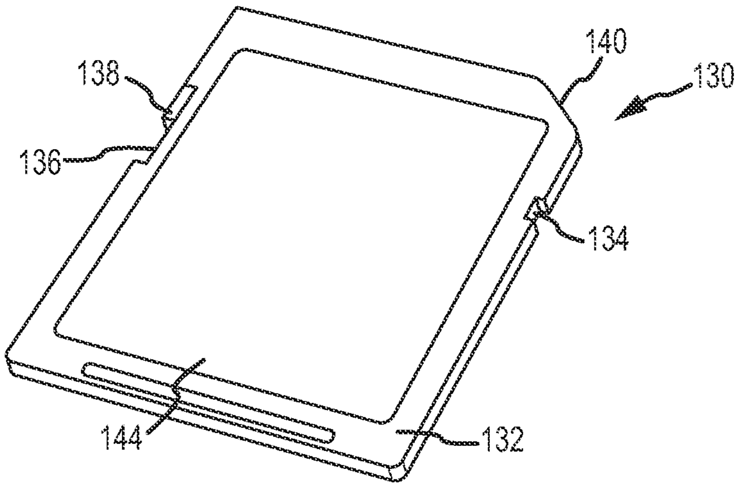
FIG. 3A is a top perspective view of a memory card configured to be received within the input port.
Figure 3B:
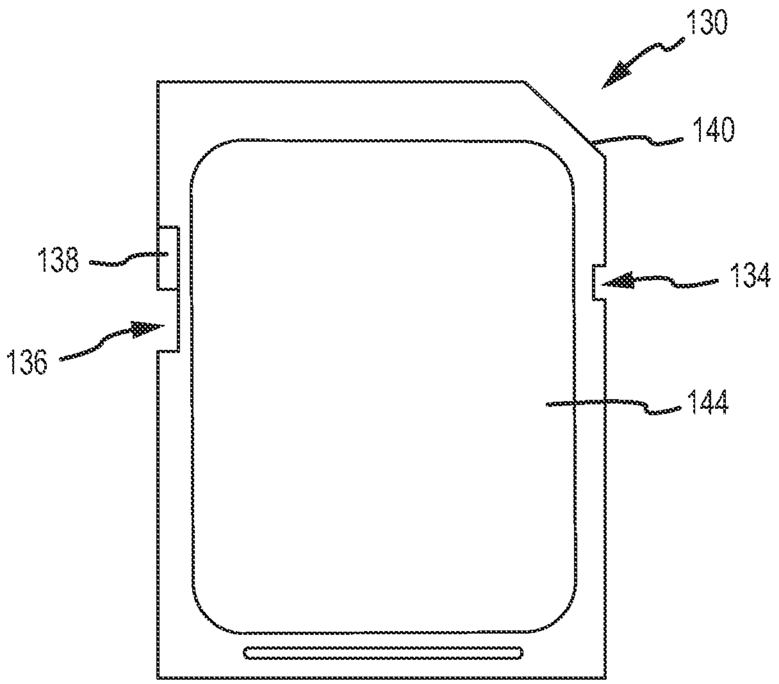
FIG. 3B is a top plan view of the memory card.
Figure 3C:
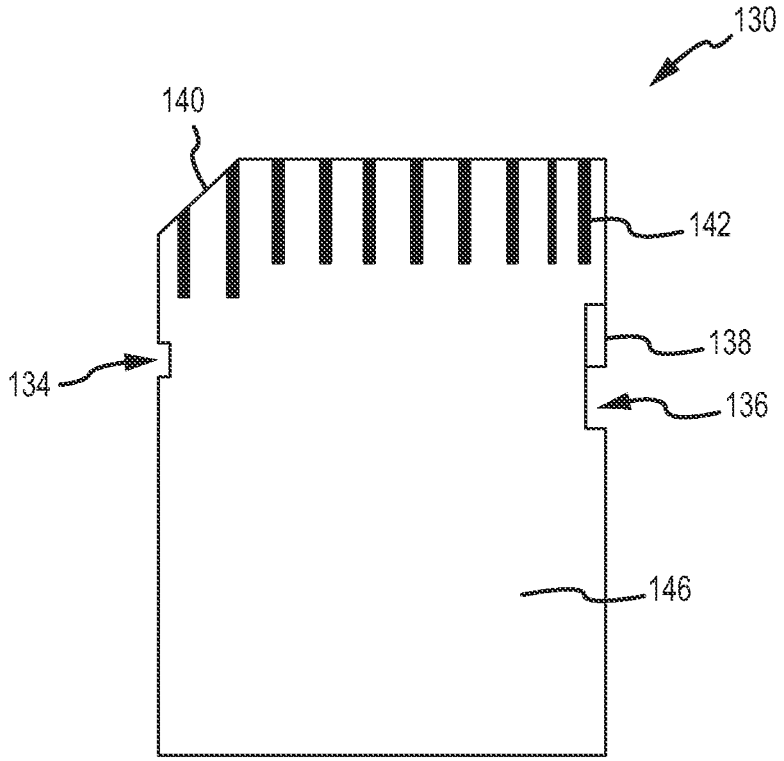
FIG. 3C is a bottom plan view of the memory card.

A second example connector for receipt in the input port 104 will now be discussed. FIG. 3A is a perspective view of a memory card 130. FIG. 3B is a top plan view of the memory card 130. FIG. 3C is a bottom plan view of the memory card 130. The memory card 130 may be a connector and memory storage combined into a single device. For example, the memory card 130 may include memory for storing data, and may also function as the plug or connector of the input port 104. Thus, the member card 130 may be inserted into the input port 104 in order to transfer data to and from the memory card 130 and the electronic device 102. In some embodiments, the memory card 130 may be a SD card, flash memory card, memory stick, multimedia card, and so on. Furthermore, although the memory card 130 may be self contained (in that it contains data and a mechanism for communicating with the electronic device 102), the memory card 130 may also be in communication with a second device, e.g. through a cable or the like.

In one example, the memory card 130 may be a SD card, as illustrated in FIG. 3A-3C. The memory card 130 may include a body 132, alignment features 134, 140, electrical contacts 142, an input switch 138, and a switch groove 136. The body 132 may substantially surround a memory element, such as a flash memory and the electrical contacts 142 provide communication to the element from outside the body 132.

In some embodiments, the electrical contacts 142 may be positioned on a back side 146 of the memory card 130. However, in other embodiments, the electrical contacts 142 may be positioned on a front side 144 of the memory card 130. The electrical contacts 142 may be configured to transfer electronic data to and from corresponding contacts within the input port 104, as will be discussed in more detail below.

The alignment features 134, 140 may assist in aligning the memory card 130 within the input port 104 and/or securing the memory card 130 within the input port 104. For example, a first alignment feature 140 may form an angled transition from a side of the memory card 130 to the top of the memory card 130. In other words, rather than having a pointed corner, the first alignment feature 140 may create an angled corner. The second alignment feature 134 may be a notch formed within a side of the body 132. The second alignment feature 134 may interact with one or more corresponding features within the input port 104 so that the memory card 130 is inserted into the correct depth and/or held in place. For example, the input port 104 may include a retaining feature such a detent or spring to interact with the alignment feature 134 to assist in securing the memory card 130 within the input port 104.

The input switch 138 may travel along a length of the switch grove 136 in transitioning the memory card 130 from a first state to a second state. For example, when the input switch 138 is in a first position, the memory card 130 may allow memory within the memory card 130 to be in a “read and write” state. When the input switch in a second position along the switch groove 136, the memory card 130 may allow the memory to in a “read only” state. Thus, data stored within the memory card 130 may be selectively prevented from being deleted or changed. It should be noted that other examples of the memory card 130 are envisioned, and FIGS. 3A-3C are for illustrative purposes only.

The Input Port

Figure 4A:
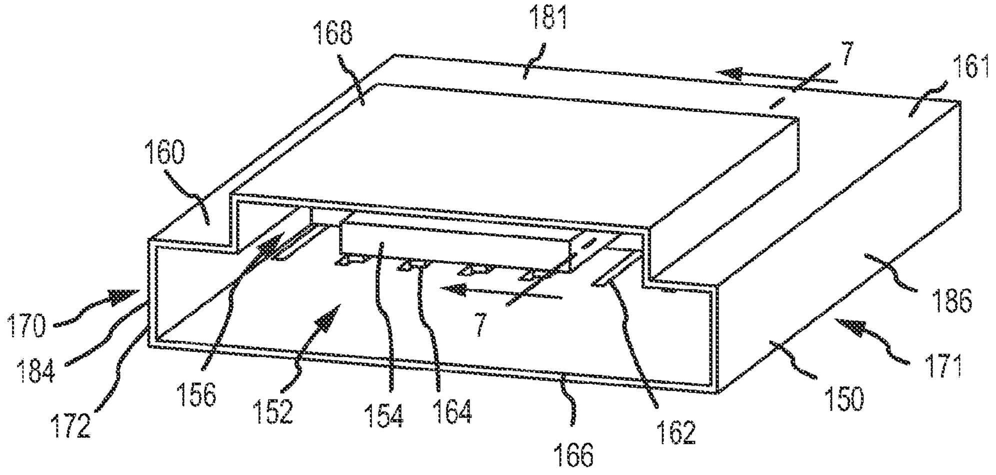
FIG. 4A is a perspective view of the input port removed from the electronic device.
Figure 4B:
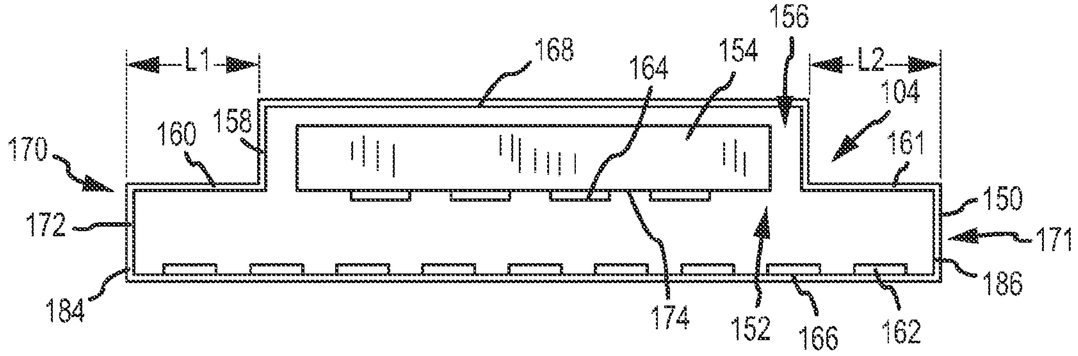
FIG. 4B is a front elevation view of the input port.

The input port 104 or receptacle will now be discussed in further detail. FIG. 4A is a perspective view of the input port 104 removed from the enclosure 106. FIG. 4B is a front elevation view of the input port 104. The input port 104 is sized to accommodate both the USB plug 110 and the memory card 130. Additionally, as described above, the input port 104 is accessible through the enclosure 106 so the USB plug 110 and the memory card 130 may be directly inserted into the input port 104. The input port 104 has an outer wall 150 or case defining a receiving aperture 152 for receiving the USB plug 110 as well as the memory card 130. However, it should be noted that the disclosure herein may apply to substantially any input port sized and/or configured to accept different types of connectors, plugs, or the like in different segments of the port interior. Thus, the discussion of any embodiment is not meant to be limiting, and the scope of the disclosure is meant to be determined by the claims.

The outer wall 150 forms the outer perimeter of the input port 104, as well as defining the shape of the receiving aperture 152. In one embodiment, the outer wall 152 may have a bottom wall 166, a top wall 168 and two sides 170, 171. The two sides 170, 171 interconnect the bottom wall 166 and the top wall 168. The two sides 170, 171 may have a stepped transition from the bottom wall 166 to the top wall 168, such that a shoulder 160, 161 may connect a first extension 172 to a second extension 158. In one embodiment, the second extension 158 is positioned inward from an end of the bottom wall 166 by a distance equal to the length L1 of the shoulder 160, 161. In this embodiment, the top wall 168 may have a reduced length compared to the bottom wall 166 and the length of the top wall 168 may be shorter than the bottom wall 166 by an amount approximately equal to two times the length of the shoulder 160. In some embodiments, the top wall 168 may also terminate at a shorter depth than a depth of the bottom surface 166. An intermediate surface 181 may extend behind and at least partially below the top surface 168. The intermediate surface 181 may be at least partially parallel with a portion of the bottom surface 166.

Figure 8:
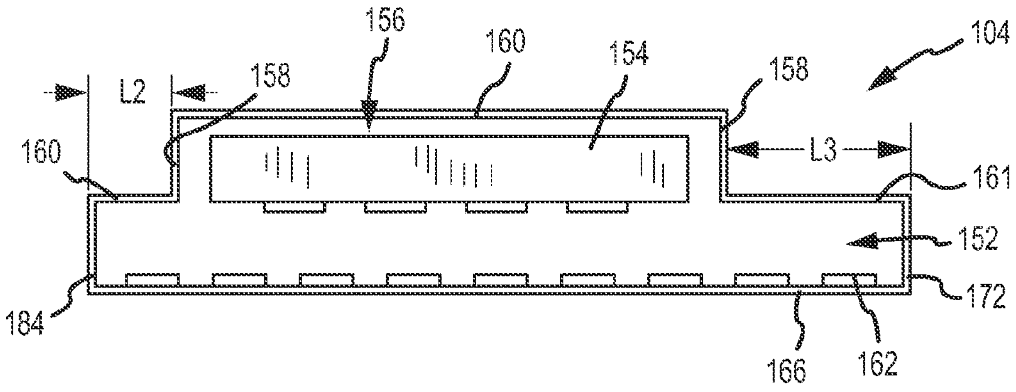
FIG. 8 is a front elevation view of a second embodiment of the input port.
Figure 9:
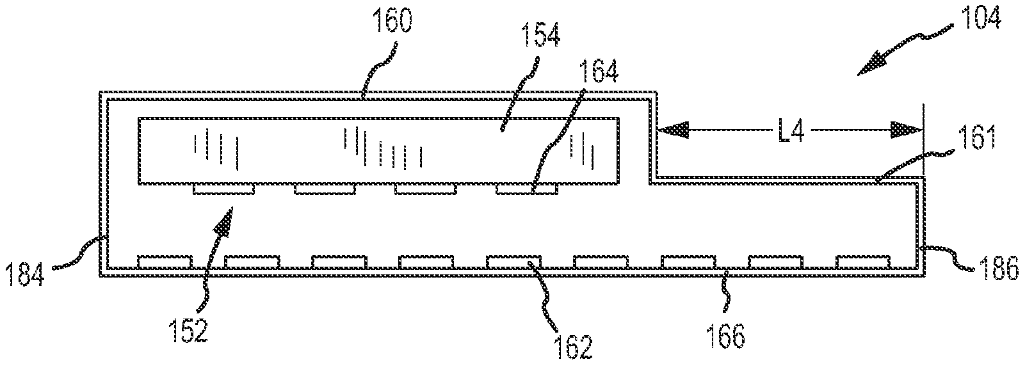
FIG. 9 is a front elevation view of a third embodiment of the input port.

Also, and with respect to the front view of FIG. 4B, it should be noted that each of the shoulders 160, 161 may have the same length L1, or may have varying lengths from each other, see, e.g., FIGS. 8 and 9. In some embodiments, the length L1 of the shoulders determines the location of the top wall 168 with respect to the bottom wall 166. For example, if both shoulders 160, 161 have the same length L1, the top wall 168 may be substantially centered over the bottom wall 166. However, if the shoulders 160, 161 have different lengths, the top wall 168 may be offset with respect to the bottom wall 166.

Still with reference to FIG. 4B, in embodiments where the top wall 168 may have a reduced length as compared to the bottom wall 166, the input port 104 may have a stepped transition from the bottom surface towards the top surface. Thus, the receiving aperture 152 may also decrease in dimension as it transitions from the bottom wall 166 towards the top wall 168. In these embodiments, the receiving aperture 152 may be wider at the bottom of the input port 104 and be better configured to receive the memory card 130. Similarly, the receiving aperture 152 may be shorter towards the top surface 158 and be better configured to receive the USB plug 110. Accordingly, in some embodiments, the bottom wall 166 may have a width approximately equal to a width of the memory card 130 and the top wall 168 may have a width approximately equal to a width of the USB plug 110. (As one example, see FIGS. 11 and 12). However, depending on the different plugs or connectors configured to be received within the input port 104 these dimensions may vary.

As shown in FIGS. 4A and 4B, the input port 104 further includes a port substrate 154 positioned within the receiving aperture 152. The port substrate 154 may be surrounded on three sides, with a front surface of the port substrate 154 exposed within the receiving aperture 152. The top wall 168 may surround a top of the port substrate 154 and the two second extension 158 may surround each of the sides of the port substrate 154. Furthermore, in some embodiments, the substrate 154 may be supported within the receiving aperture 152 by a back wall forming a back end of the top wall 168. For example, the port substrate 154 may extend substantially perpendicularly away from the back wall into the receiving aperture 152. The port substrate 154 may be positioned so that may be a space 156 surrounding the inner surface of the outer wall 150 and the port substrate 154. As will be discussed in more detail below, the space 156 may receive the case 112 of the USB plug 110.

Substrate contacts 164 may be spaced on a bottom surface 174 of the port substrate 154. The substrate contacts 164 may be in electrical communication with various components of the computing device 100, such as a processor, system bus, memory, and so on. Further, the substrate contacts 164 are also configured to communicate between the electrical contacts 116 of the USB plug 110 and/or memory card 130. It should be noted that the location and/or number of substrate contacts 164 may vary depending on the type of connectors to be received within the input port 104. For example, if the USB plug 110 is a USB2 or USB3 plug, there may be set of substrate contacts 164 positioned on the substrate 154 farther from the back wall than the substrate contacts 164 illustrated in FIG. 5. The port substrate 154 may also include retention members (not shown) positioned on the bottom surface 174 in order to interact with the features on the USB plug 110.

The input port 104 also includes surface contacts 162 positioned on an inner surface of the bottom wall 166 and facing inwards towards the port substrate 154. In some embodiments, the surface contacts 162 are configured to be in communication with the electrical contacts 142 on the memory card 130. In these embodiments, the surface contacts 142 may be positioned so as to communicate between the components of the computing device 100 and the memory card 130. For example, as described above with respect to the substrate contacts 164, the surface contacts 162 may communicate with a processor, system bus, and so on of the computing device 100.

Figure 5:
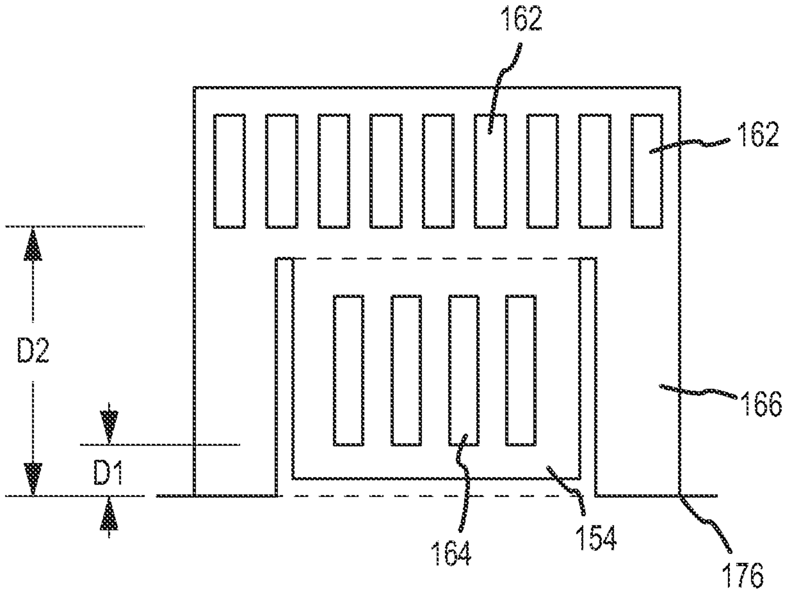
FIG. 5 is a top plan view of the input port with a top surface and an intermediate surface removed to clearly illustrate certain features.

FIG. 5 is a top plan view of the input port 104 with the top wall 168, shoulders 160, 161, and intermediate wall 181 removed for clarity. As can be seen in FIG. 5, in some embodiments, the surface contacts 162 may be positioned deeper within the input port 104 than the substrate contacts 164. For example, a front of the substrate contacts 164 may be positioned at a depth D1 from a front end 176 of the input port 104, and a front of the surface contacts 162 may be positioned at a depth D2 from the front end 176. The depth D1 may be less than the depth D2, such that the surface contacts 162 maybe positioned towards or approximately at a back end 178 of the input port 104.

The differing depths D1, D2 of the surface contacts 162 compared to the substrate contacts 164 allows the surface contacts 162 to be aligned, but positioned deeper than the USB plug 110 contacts 118A-C, when the USB plug 110 is inserted into the input port 104. This may prevent the surface contacts 162 and the substrate contacts 164 from interfering with each other, as well as preventing the USB plug 110 contacts 118 and/or the memory card 130 contacts from mating with the incorrect set of contacts. The contacts 162, 164 may have different voltages, data transfer rates, or the like. Either sets of contacts 162, 164 may work with the appropriate input, and may potentially damage other inputs. Accordingly, by differing the position of the contacts 162, 164 the chance that the contacts 162, 164 may align with and/or communicate with the wrong type of input is reduced.

Figure 6:
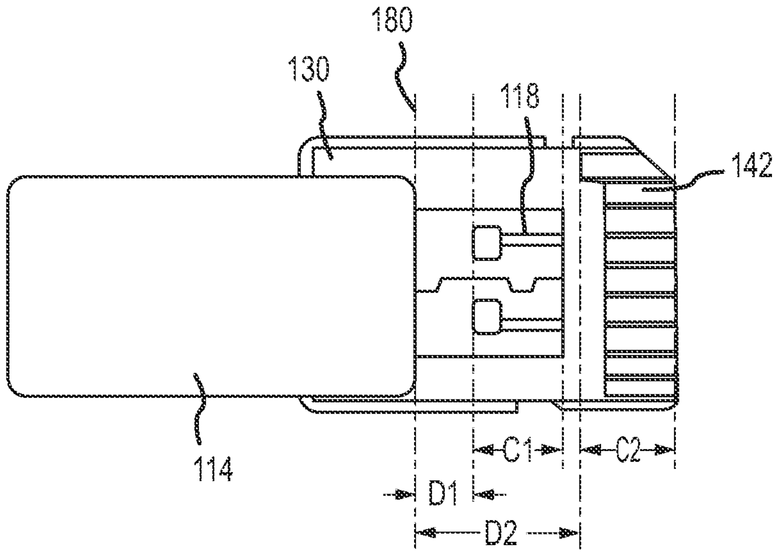
FIG. 6 is a top plan view of the USB plug positioned over the memory card illustrating the varying contact positions of the USB plug and the memory card.

In some instances the memory card 130 may be wider than the USB plug 110. FIG. 6 is a top elevation view of the USB plug 110 positioned over the memory card 130. As can been seen in FIG. 6, in some examples, the contacts 142 of the memory card 130 may be positioned deeper in the input port 104 than the USB plug 110. For example, the memory card 130 and the USB plug 110 may be inserted into the port 104 and align with the front edge 176 as shown as dashed line 180 in FIG. 6. The USB plug 110 may align within the input port 104 so that its contact length C1 may substantially overlay the substrate contacts 164. Similarly, the memory card 130 may be positioned within the input port 104 so that its contact length C2 may overlay the surface contacts 162.

Figure 7:
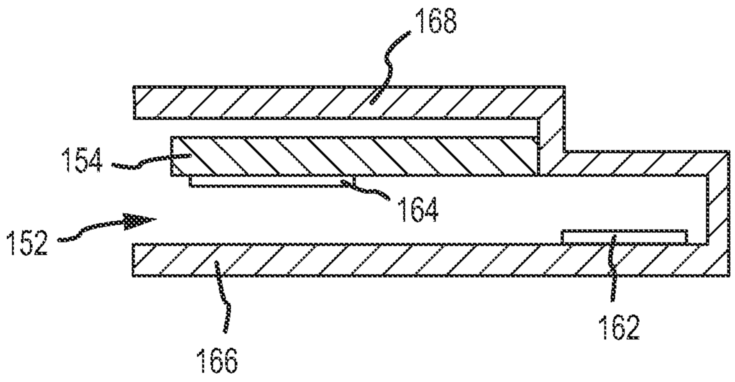
FIG. 7 is a simplified cross-section view of the input port taken along line 7-7 in FIG. 4A.

FIG. 7 is a cross-sectional view of the input port 104. As shown in FIG. 7, the varying depths of the contacts 162, 164, allow the contacts to be spaced apart from each other within the receiving aperture 152, and as described above, allow for the contacts on the USB plug 110 and the memory card 130, which may have different characteristics, to be positioned in different locations of the input port 104.

As briefly described above, in some embodiments, the shoulders 160, 161 of the outer wall 150 may have different lengths from each other. FIG. 8 is a front elevation view of a second embodiment of the input port 104 with the shoulders 160, 161 having different lengths. The first shoulder 160 may have a length L2 whereas the second shoulder 161 may have a length L3. As shown in FIG. 8, the length L1 may be shorter than the length L2, such that the substrate 154 may be positioned closer to a first edge 184 of the input port 104 than a second edge 186. In other words, the substrate 154 and/or the top wall 168 may be positioned off-center with respect to the bottom wall 166.

In other embodiments, the first shoulder 160 may be eliminated, such that the first edge 184 of the input port 104 may be substantially vertical. FIG. 9 is a front elevation view of a third embodiment of the input port 104 where the first edge 184 is substantially vertical. As shown in FIG. 9, the first edge 184 transitions from the bottom wall 166 to the top wall 168 in a substantially straight manner, such that the first edge 184 may be perpendicular to both the top wall 168 and the bottom wall 166. In this embodiment, the second shoulder 161 may have a length L4, which may be longer than the shoulder lengths in the other embodiments.

Figure 10:
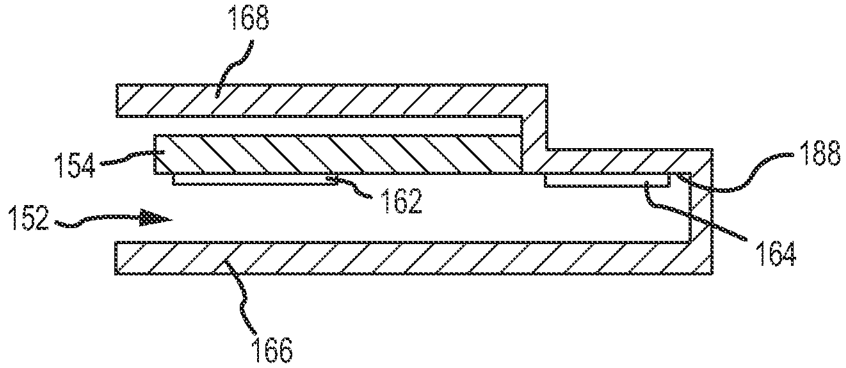
FIG. 10 is a cross-section view of a fourth embodiment of the input port.

Additionally or alternatively, the contacts 162, 164 may be positioned in other locations within the input port 104. FIG. 10 is a cross-sectional view of a fourth embodiment of the input port 104. As shown in FIG. 10, the surface contacts 164 may be positioned on an inner surface 188 of the second shoulder 161. In this embodiment, the surface contacts 164 may be positioned at the same depth D2 as in FIG. 4B but on an opposite surface. Accordingly, the memory card 130 may be inserted into the receiving aperture 152 at substantially the same depth, but may be inserted in the opposite manner as it may be inserted in FIG. 4B. This is because the surface contacts 162 may not be above the bottom wall 166 and therefore the electrical contacts 142 on the memory card 130 may need to be in contact with the surface contacts 162.

Figure 11:
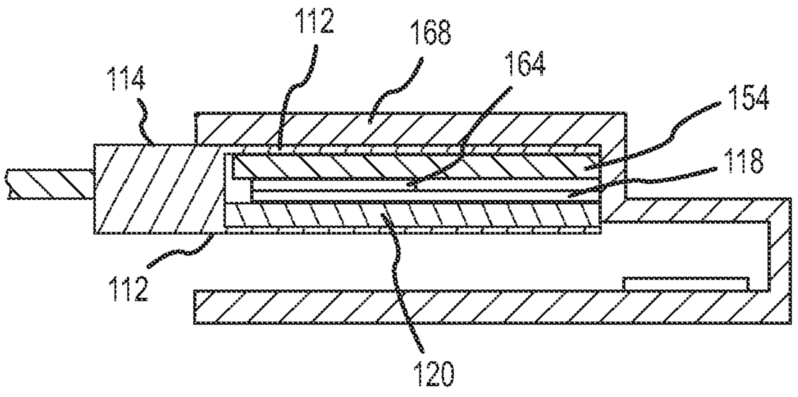
FIG. 11 is a cross-section view of the input port of FIG. 4A with the USB plug received therein.

Insertion of the USB plug 110 and the memory card 130 into the input port 104 will now be discussed in more detail. FIG. 11 is a cross-sectional view of the input port 104 with the USB plug 110 received therein. As shown in FIG. 11, the USB plug 110 may be inserted so that substantially the entire case 112 may be received within the input port 104. As the USB plug 110 is inserted, the case 112 may be positioned on both sides of the substrate 154, so that the case 112 is adjacent to an inner surface of the top wall 168 and is positioned within a middle portion of the receiving aperture 152. The contact support member 120 of the USB plug 110 may be aligned with the substrate 154 of the input port 104, and the substrate contacts 164 may be in contact with the contacts 118 of the USB plug 110. In this manner, the contacts 118, 164 may transfer data and/or power between an external device connected to the USB plug 110 and the computing device 100.

Figure 12:
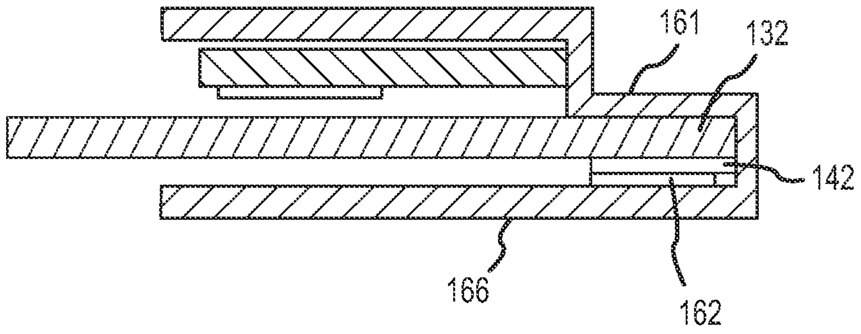
FIG. 12 is a cross-section view of the input port of FIG. 4A with the memory card received therein.

The memory card 130 may also be inserted into the receiving aperture 152, but may align differently than the USB plug 110. FIG. 12 is a cross-sectional view of the input port 104 with the memory card 130 received therein. As shown in FIG. 12, the memory card 130 may be inserted so as to extend substantially the entire depth of the input port 104. The port substrate 154 and the shoulders 160, 161 may form an upper edge to securing guide and/or retain the memory card 130 within the input port 104. The memory card 130 may be received beneath the substrate 154, and as the body 132 of the memory card 130 is rather thin as compared with the USB plug 110, it may not substantially contact the substrate contacts 164 when positioned within the receiving aperture 152. As the memory card 130 is inserted, the electrical contacts 142 on the memory card 130 may be in contact with the surface contacts 162 on the bottom wall 166. The memory card 130 may be substantially adjacent with the shoulder 161 and a back side of the input port 104 when its received therein. Also, although not shown in FIG. 12, the input port 104 may include one more detents or retraining features to interact with the alignment feature 134 to secure the memory card 130 within the input port 104.

CONCLUSION

The foregoing description has broad application. For example, while examples disclosed herein may focus on an input port for receiving a USB plug and a SD card, it should be appreciated that the concepts disclosed herein may equally apply to connectors and plugs. Similarly, although the input port may be discussed with respect to a computer, the devices and techniques disclosed herein are equally applicable to any type of device including an external connector for transferring data and/or power. Accordingly, the discussion of any embodiment is meant only to be an example and is not intended to suggest that the scope of the disclosure, including the claims, is limited to these examples.

What is claimed is:

1. An input port for an electronic device comprising:
- an outer wall defining a receiving aperture comprising:
  - a first aperture portion having a first width; and
  - a second aperture portion having a second width, the first and second aperture portions adjacent one another;
- a substrate positioned primarily within the first aperture portion and protruding from a back wall of the input port, the substrate separated from the outer wall by a fixed distance;
- a first set of contacts positioned on the substrate at a first depth into the receiving aperture, the first set of contacts oriented to face an interior of the second aperture portion; and
- a second set of contacts positioned on a first surface of the outer wall at a second depth into the second aperture portion, the second set of contacts oriented to face the interior of the second aperture portion and the first set of contacts; wherein
- when a first connector is received around the substrate and within the first aperture portion at a first depth, the first set of contacts communicates with the first connector; and
- when a second connector is received within the second aperture portion at a second depth, the second set of contacts communicates with the second connector.

2. The input port of claim 1, wherein the first connector is a male universal serial bus connector and the second connector is a memory card.

3. The input port of claim 1, wherein the first surface is a bottom surface of the outer wall.

4. The input port of claim 1, wherein the outer wall further comprises:
- a bottom wall; and
- a top wall substantially parallel to the bottom wall and having a length shorter than a length of the bottom wall.

5. The input port of claim 4, wherein the substrate has a length substantially equal to the length of the top wall and the substrate is positioned beneath and substantially parallel to the top wall.

6. The input port of claim 5, wherein the first set of contacts is positioned on a bottom surface of the substrate facing away from the top wall.

7. The input port of claim 4, wherein a shoulder is positioned between the top wall and the bottom wall.

8. The input port of claim 7, wherein the first surface is an inner surface of the shoulder.

9. The input port of claim 1, wherein the first depth is shorter than the second depth.

10. An electronic device comprising:

an enclosure; and an input receptacle defined within the enclosure comprising:

a substrate;

a bottom wall;

a top wall operably connected to the bottom wall;

a receiving aperture defined by the bottom wall and a first surface of the substrate, the receiving aperture comprising:

a first aperture portion having a first width; and a second aperture portion having a second width, the first and second aperture portions adjacent one another;

a first electrical contact extending from first surface of the substrate, oriented to face an interior of the first aperture portion; and a second electrical contact extending from an inner surface of the bottom wall, oriented to face the interior of the second aperture portion and the first set of contacts; wherein the first electrical contact is configured to transfer data and/or power to another device of a first device type received within the input receptacle; and the second electrical contact is configured to transfer data and/or power to another device of a second device type received within the input receptacle.

11. The electronic device of claim 10, wherein the first electrical contact is positioned at a first depth with respect to a front end of the input port; and the second electrical contact is positioned at a second depth with respect to the front end of the input port; and the first depth is shorter than the second depth.

12. The electronic device of claim 10, wherein the first electrical contact is configured to communicate with a universal serial bus connector or a micro universal serial bus connector.

13. The electronic device of claim 10, wherein the second electrical contact is configured to communicate with a memory card.

14. The electronic device of claim 10, wherein the substrate is positioned between the bottom wall and the top wall.

15. The input port of claim 1, wherein the outer wall is integrally formed.

16. The input port of claim 1, further comprising a back wall integrally formed with the outer wall and defining a back end of the input port, wherein the substrate extends from the back wall.

17. The input port of claim 16, wherein the substrate has a length that is shorter than a length of the receiving aperture.

18. The input port of claim 16, wherein the substrate terminates prior to reaching one or more sidewalls of the outer wall.

19. The input port of claim 16, wherein the sidewall is anchored on a single end.

20. The input port of claim 1, wherein the receiving aperture is T-shaped.

* * * * *